(12) United States Patent
Hokiyama

(10) Patent No.: US 9,766,877 B2
(45) Date of Patent: Sep. 19, 2017

(54) INFORMATION PROCESSING APPARATUS THAT PERFORMS UPDATE OF FIRMWARE, CONTROL METHOD FOR THE INFORMATION PROCESSING APPARATUS, AND STORAGE MEDIUM

(71) Applicant: CANON KABUSHIKI KAISHA, Tokyo (JP)

(72) Inventor: Takeshi Hokiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/954,127

(22) Filed: Nov. 30, 2015

(65) Prior Publication Data

US 2016/0162281 A1    Jun. 9, 2016

(30) Foreign Application Priority Data

Dec. 5, 2014 (JP) .................................. 2014-246991

(51) Int. Cl.
*G06F 9/44* (2006.01)
*G06F 9/445* (2006.01)

(52) U.S. Cl.
CPC ...................................... *G06F 8/65* (2013.01)

(58) Field of Classification Search
None
See application file for complete search history.

(56) References Cited

U.S. PATENT DOCUMENTS

| | | | |
|---|---|---|---|
| 2004/0230968 A1* | 11/2004 | Masunaga | H04L 29/06 717/171 |
| 2006/0221684 A1* | 10/2006 | Iwai | G06F 8/65 365/185.03 |
| 2007/0022328 A1* | 1/2007 | Tarra | G06F 11/1433 714/100 |
| 2009/0276655 A1* | 11/2009 | Quere | G06F 11/1417 714/2 |
| 2010/0117791 A1* | 5/2010 | Inoue | G06F 21/32 340/5.52 |
| 2010/0169876 A1* | 7/2010 | Mann | G06F 8/65 717/170 |

(Continued)

FOREIGN PATENT DOCUMENTS

| | | |
|---|---|---|
| JP | 2002055825 A | 2/2002 |
| JP | 2007004377 A | 1/2007 |
| JP | 2014123864 A | 7/2014 |

OTHER PUBLICATIONS

Office Action issued in Japanese Appln. No. 2014-246991 mailed Jan. 31, 2017.

*Primary Examiner* — H S Sough
*Assistant Examiner* — Timothy Duncan
(74) *Attorney, Agent, or Firm* — Rossi, Kimms & McDowell LLP

(57) ABSTRACT

An information processing apparatus which is capable of executing download of firmware and smoothly updating the firmware. A file indicating that download of the firmware is disabled is stored in a storage unit according to a disable setting which disables download of the firmware. The file is deleted from the storage unit according to an enable setting which enables download of the firmware. Download of the firmware is executed according to presence or absence of the file.

8 Claims, 9 Drawing Sheets

(56) References Cited

U.S. PATENT DOCUMENTS

| | | | | |
|---|---|---|---|---|
| 2010/0199078 A1* | 8/2010 | Shih | ................... | G06F 8/65 |
| | | | | 713/2 |
| 2014/0325496 A1* | 10/2014 | Son | ................... | G06F 8/65 |
| | | | | 717/168 |
| 2016/0188430 A1* | 6/2016 | Nitta | ................... | G06F 8/65 |
| | | | | 714/6.3 |

* cited by examiner

FIG. 4

ADMINISTRATOR AUTHENTICATION

PLEASE ENTER ID AND PASSWORD OF ADMINISTRATOR

ID

PASSWORD

OK    CANCEL

FIRMWARE UPDATE SETTING

501 — ● UPDATE ENABLED

502 — ○ UPDATE DISABLED

503 — OK    CANCEL — 504

500

INFORMATION PROCESSING APPARATUS THAT PERFORMS UPDATE OF FIRMWARE, CONTROL METHOD FOR THE INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium.

Description of the Related Art

Server apparatuses, PCs, and image forming apparatuses such as MFPs (multi-function printers) are known as conventional information processing apparatuses. A plurality of information processing apparatuses are connected to one another via a network, and firmware is applied to each of the information processing apparatuses. Firmware is updated on a regular basis so as to deal with vulnerability in terms of security and malfunctions, and data for firmware which is to be used for update is, for example, downloaded to the information processing apparatuses via a network.

As users of an information processing apparatus, there are a serviceperson who updates firmware and an administrator user who manages security conditions of the information processing apparatuses. Here, it is preferred that update of firmware is performed by the administrator user, not by the serviceperson, from the viewpoint of properly managing security conditions of the information processing apparatus.

There is known an information processing apparatuses in which a flag for determining whether or not to update firmware applied to the information processing apparatus is stored in advance in a predetermined storage area such as an NV-RAM by a management user (see, for example, Japanese Laid-Open Patent Publication (Kokai) No. 2007-4377). The information processing apparatus described in Japanese Laid-Open Patent Publication (Kokai) No. 2007-4377 downloads data on firmware for update via a network and determines whether or not to update firmware based on a flag included in the flag.

However, if a storage area is corrupt when a flag indicating that firmware is not to be updated (hereafter referred to as a "disable flag") is stored in the storage area, the disable flag stored in the storage area cannot be updated to a flag indicating that firmware is to be updated (hereafter referred to as an "enable flag"). This leads to a problem that firmware applied to an image forming apparatus cannot be updated.

SUMMARY OF THE INVENTION

The present invention provides an information processing apparatus and a control method therefor, which are capable of smoothly updating firmware, as well as a storage medium.

Accordingly, the present invention provides an information processing apparatus capable of executing download of firmware, comprising a storage unit configured to store a file indicating that download of the firmware is disabled according to a disable setting which disables download of the firmware, a deleting unit configured to delete the file from the storage unit according to an enable setting which enables download of the firmware, and an execution unit configured to execute download of the firmware according to presence or absence of the file.

According to the present invention, firmware is smoothly updated.

Further features of the present invention will become apparent from the following description of exemplary embodiments (with reference to the attached drawings).

BRIEF DESCRIPTION OF THE DRAWINGS

FIG. 4 is a view useful in explaining an administrator authentication screen which is displayed on an operating unit in the disable flag storage process in FIG. 3.

FIG. 5 is a view useful in explaining a update enable screen which is displayed on the operating unit in the disable flag storage process in FIG. 3.

DESCRIPTION OF THE EMBODIMENTS

The present invention will now be described in detail with reference to the drawings showing an embodiment thereof.

Figure 1:
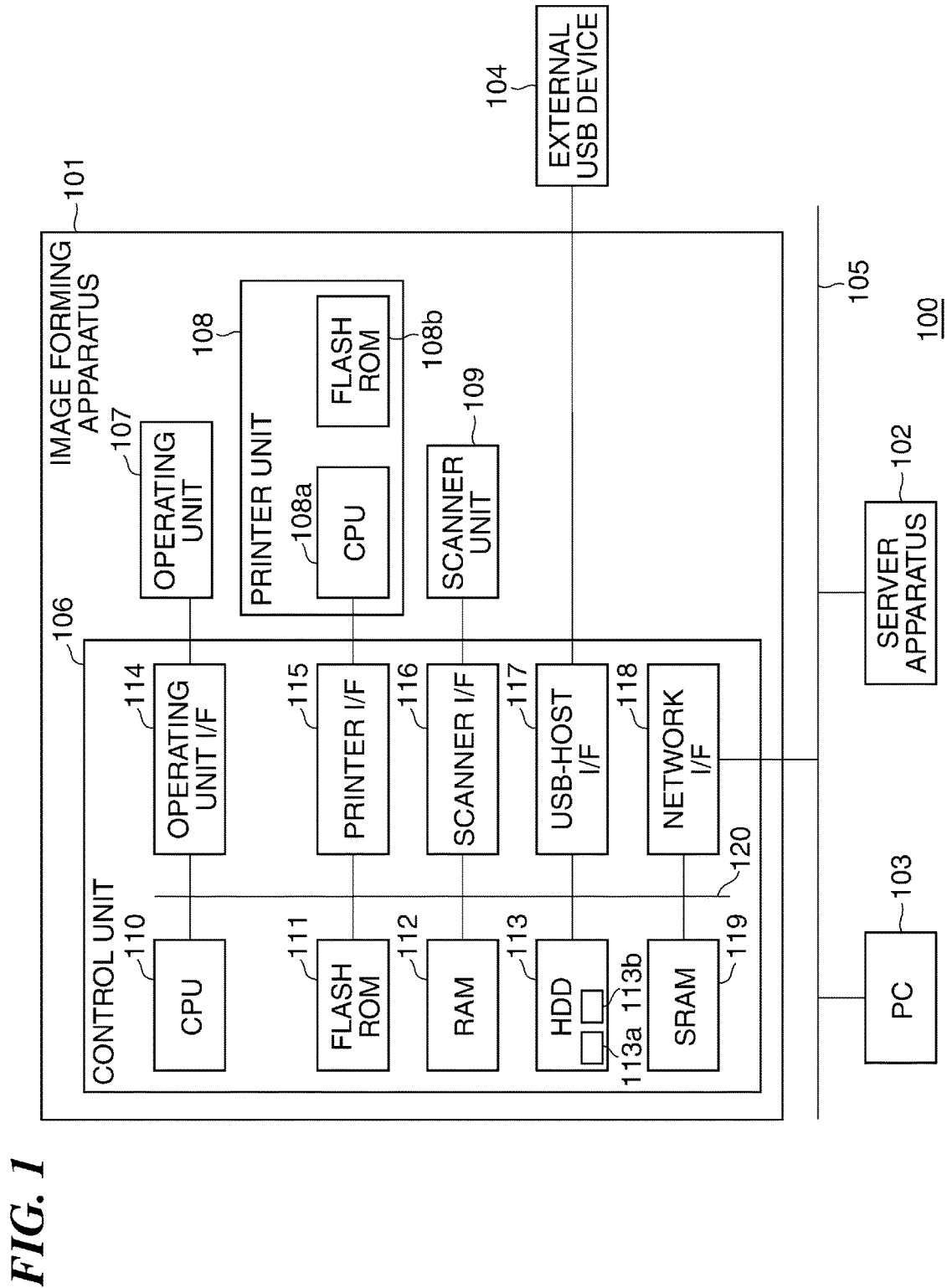
FIG. 1 is a block diagram schematically showing an arrangement of an information processing system including an image forming apparatus which is an information processing apparatus according to an embodiment of the present invention.

FIG. 1 is a block diagram schematically showing an arrangement of an information processing system 100 including an image forming apparatus 101 which is an information processing apparatus according to an embodiment of the invention.

The information processing system 100 in FIG. 1 has the image forming apparatus 101, a server apparatus 102, a PC 103, and an external USB device 104. The image forming apparatus 102, the server apparatus 102, and the PC 103 are connected to one another via a LAN 105. The external USB device 104 is connected to a USB-Host I/F 117, to be described later.

The image forming apparatus 101 has a control unit 106, an operating unit 107, a printer unit 108 having a CPU 108*a* and a flash ROM 108*b*, and a scanner unit 109. The control unit 106 has a CPU 110, a flash ROM 111, a RAM 112, an HDD 113 having a flag area 113*a* and a program area 113*b*, an operating unit I/F 114, a printer I/F 115, a scanner I/F 116, the USB-Host I/F 117, a network I/F 118, and an SRAM 119. These component elements are connected to one another via an internal bus 120. The operating unit I/F 114, the printer I/F 115, the scanner I/F 116, and the network I/F 117 are connected to the operating unit 107, the printer unit 108, the scanner unit 109, and the LAN 105, respectively.

The server apparatus 102 stores data on firmware for use in updating firmware applied to the image forming apparatus 101. The PC 103 sends, for example, image data to the image forming apparatus 101. The external USB device 104 is, for example, a USB memory or a USB keyboard. The operating unit 107 is, for example, a liquid crystal touch panel, and a user inputs instructions to the image forming apparatus 101 via the liquid crystal touch panel. By the CPU 108a executing a program stored in the flash ROM 108b, the printer unit 108 prints image data on a recording sheet. The scanner unit 109 reads an original to generate image data.

The CPU 110 loads programs stored in the ROM 111 or the program area 113b into the RAM 112 and executes them to control the image forming apparatus 101. The HDD 113 stores image data received from the PC 103 and image data generated by the scanner unit 109. An enable flag or a disable flag is stored in the flag area 113a of the HDD 113. When the HDD 113 is corrupt, readout of an enable flag or a disable flag stored in the flag area 113a is impossible. Firmware 200, to be described later, is stored in the program area 113b of the HDD 113. The SRAM 119 is a nonvolatile storage medium running at speed and stores various programs, various data, and so forth. It should be noted that an enable flag or a disable flag may be stored in the SRAM 119.

Figure 2:
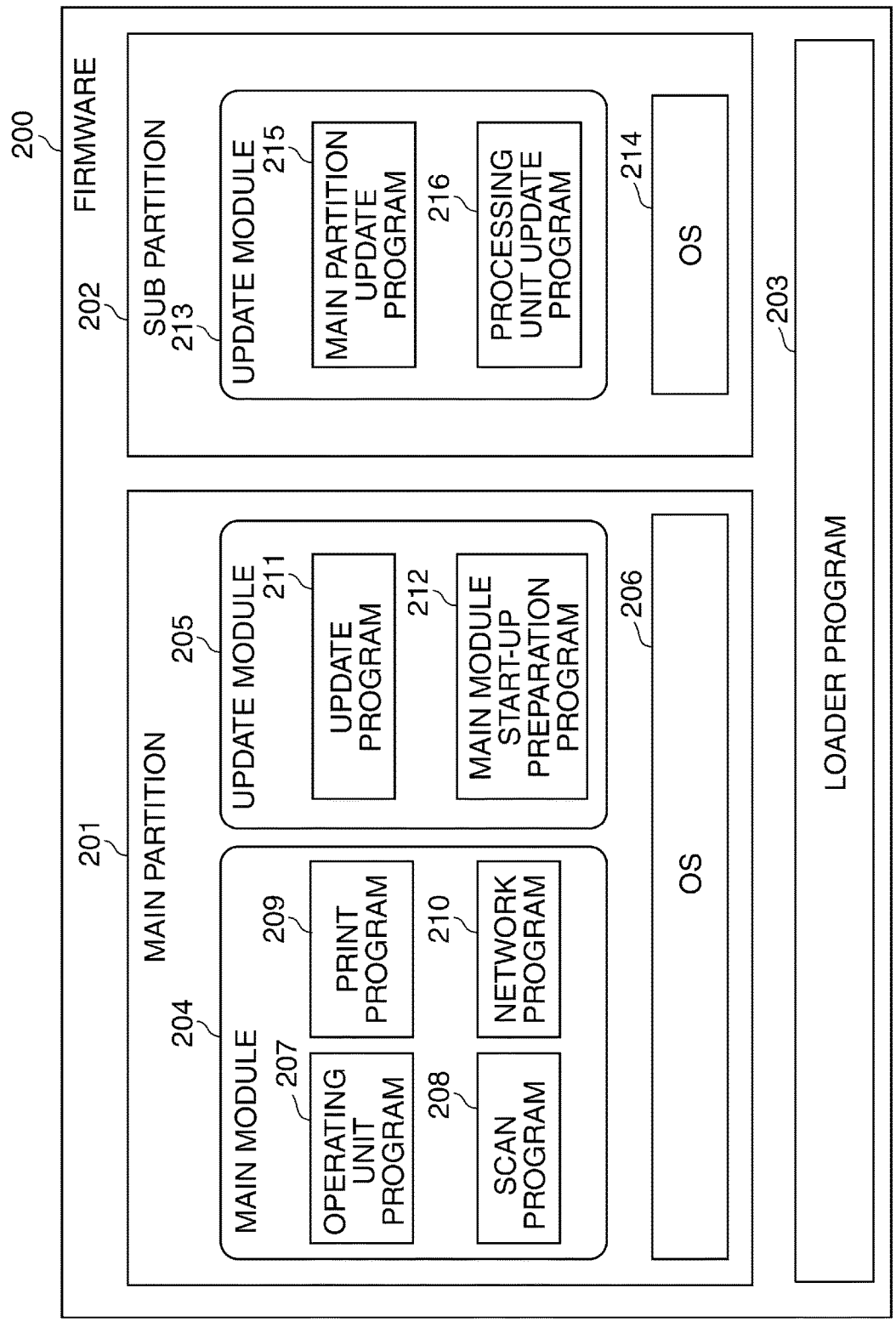
FIG. 2 is a block diagram schematically showing an arrangement of firmware executed by the image forming apparatus in FIG. 1.

FIG. 2 is a block diagram schematically showing an arrangement of the firmware 200 which is executed by the image forming apparatus 101 in FIG. 1.

The firmware 200 in FIG. 2 is comprised of a main partition 201, a sub partition 202, and a loader program 203, and these component elements are stored in the program area 113b.

The main partition 201 has a main module 204, an update module 205, and an operating system (hereafter referred to as an "OS") 206. The main module 204 has an operating unit program 207, a scan program 208, a print program 209, and a network program 210, and the update module 206 has an update program 211 and a main module start-up preparation program 212. The programs of the main module 204 and the update module 205 are each executed by the started OS 206.

The sub partition 202 has an update module 213 and an OS 214, and the update module 213 has a main partition update program 215 and a processing unit update program 216. The programs of the update module 213 are each executed by the started OS 214.

The loader program 203 detects whether or not the image forming apparatus 101 is to shift into a maintenance mode. When it is detected that the image forming apparatus 101 is to shift into the maintenance mode, the CPU 110 starts the OS 214 of the sub partition 202 and updates the programs of the main partition 201. When it is detected that the image forming apparatus 101 is not to shift into the maintenance mode, the CPU 110 starts the OS 206 of the main partition 201. The OS 206 and the OS 214 have programs for controlling operation of the component elements of the image forming apparatus 101 and control the image forming apparatus 101.

The operating unit program 207 performs processing based on instructions which a user inputs to the image forming apparatus 101 via the operating unit 107. Specifically, an administrator user inputs an instruction to update firmware via the operating unit 107, and based on the input instruction, the operating unit program 207, for example, deletes a disable flag if the disable flag is stored in the flag area 113a.

The scan program 208 carries out a scanning process in which the scanner unit 109 reads an original to generate image data, and the print program 209 carries out a printing process in which the printer unit 108 prints image data on a recording sheet. The network program 210 carries out a communication process for the image forming apparatus 101 to communicate with the server 102 and the PC 103.

The update program 211 updates the programs which the main partition 201 and the sub partition 202 have. The main module start-up preparation program 212 carries out an initialization process required for the CPU 110 to execute the main module 204. The main partition update program 215 updates the programs which the main partition 201 has. The processing unit update program 216 updates, for example, the scan program 208 and the print program 209.

Here, when the HDD 113 is corrupt, the programs constituting the firmware 200 are not started. For example, the operating unit program 207 is not started. As a result, even when the administrator user inputs an instruction to update firmware via the operating unit 107, a disable flag stored in the flag area 113a is not deleted based on the input instruction.

Figure 3:
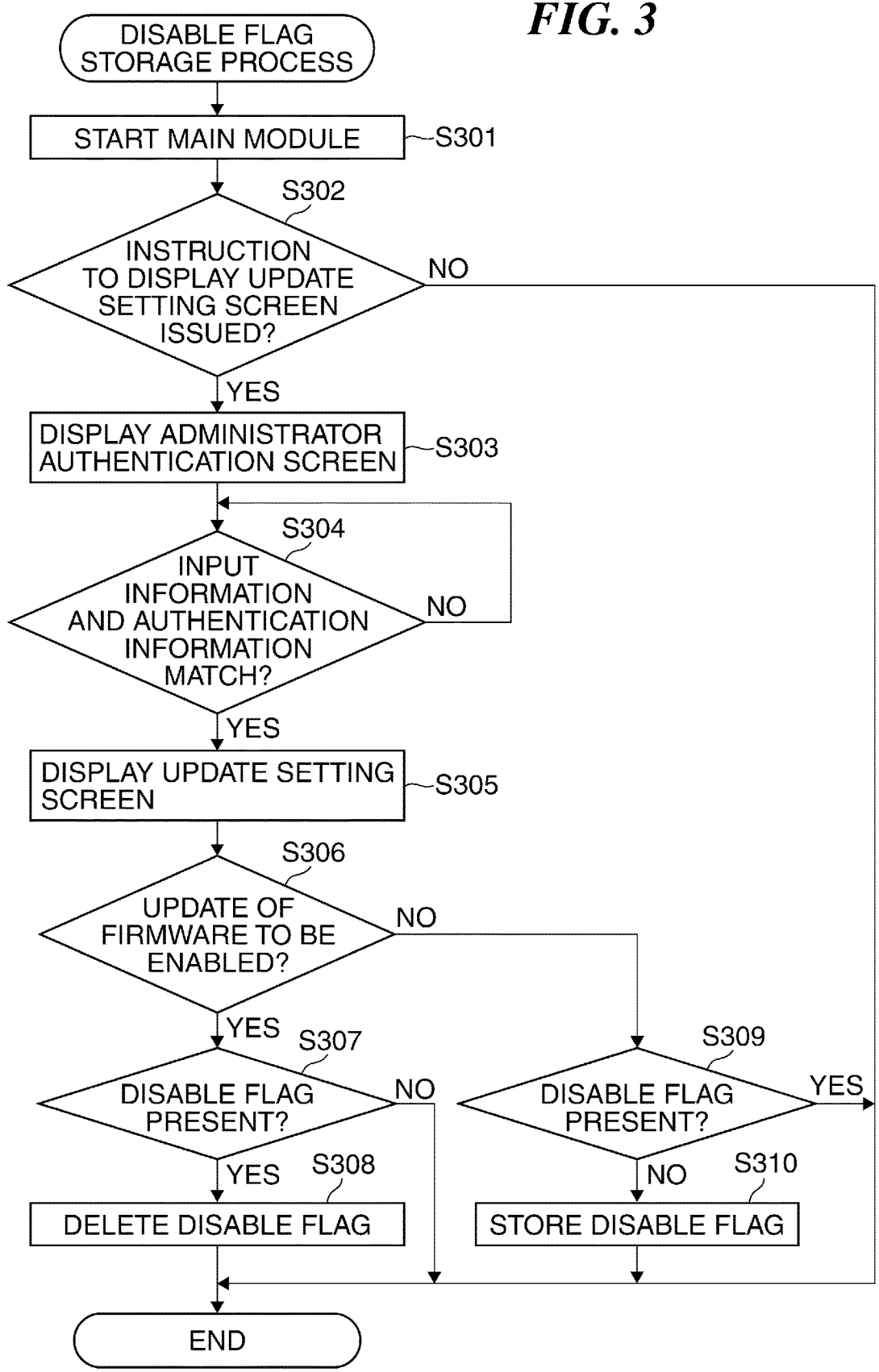
FIG. 3 is a flowchart showing the procedure of a disable flag storage process which is carried out by a CPU in FIG. 1.

FIG. 3 is a flowchart showing the procedure of a disable flag storage process which is carried out by the CPU 110 in FIG. 1.

Referring to FIG. 3, first, the CPU 110 starts the main module 204 (step S301) and determines whether or not the administrator user who is a user of the image forming apparatus 101 has issued an instruction to display an update enable screen 500 (FIG. 5), to be described later, on the operating unit 107 (step S302). As a result of the determination of the step S302, when no instruction to display an update enable screen 500 on the operating unit 107 has been issued, the process is terminated. On the other hand, when the instruction to display the update enable screen 500 on the operating unit 107 has been issued, the CPU 110 displays an administrator authentication screen 400 (FIG. 4), which is for authenticating the administrator user, on the operating unit 107 (step S303). In the image forming apparatus 101, authentication information on the administrator user is stored in advance in, for example, the HDD 113, and the CPU 101 determines whether or not input information input to the administrator authentication screen 400, for example, an ID and a password match the user authentication information stored in advance in the HDD 113 (step S304).

As a result of the determination of the step S304, when the input information input to the administrator authentication screen 400 does not match the user authentication information stored in advance in the HDD 113, the process returns to the step S304. On the other hand, when the input information input to the administrator authentication screen 400 matches the user authentication information stored in advance in the HDD 113, the CPU 110 displays the update enable screen 500, which prompts the administrator user to decide whether or not to enable update of firmware, on the operating unit 107 (step S305).

The update enable screen 500 in FIG. 5 has radio buttons 501 and 502, an OK button 503, and a cancel button 504. The administrator user selects the radio button 501 when enabling update of firmware, and selects the radio button 502 when not enabling update of firmware. When the administrator user selects the radio button 501 and depresses the OK button 503, for example, no flag is stored in the flag area 113a (enable setting). When the administrator user selects the radio button 502 and depresses the OK button 503, for example, a disable flag is stored in the flag area 113a (disable setting).

It should be noted that in the present embodiment, when the radio button 501 is selected, no flag is stored in the flag area 113*a*, but an enable flag may be stored in the flag area 113*a*. Also, when the radio button 502 is selected, a disable flag is stored in the flag area 113*a*, but something other than a disable flag, for example, a file with information indicating that firmware is not to be updated may be stored the flag area 113*a*.

Referring again to FIG. 3, the CPU 101 determines whether or not the radio button 501 has been selected via the update enable screen 500 (step S306). As a result of the determination of the step S306, when the radio button 501 has been selected, the CPU 101 determines whether or not a disable flag is stored in the flag area 113*a* (step S307). As a result of the determination of the step S307, when a disable flag is stored in the flag area 113*a*, the CPU 101 deletes the disable flag from the flag area 113*a* (step S308) and terminates the process. On the other hand, when no disable flag is stored in the flag area 113*a*, the present process is terminated with the step S308 skipped.

As a result of the determination of the step S306, when the radio button 501 has not been selected (that is, when the radio button 502 has been selected), the CPU 101 determines whether or not a disable flag is stored in the flag area 113*a* (step S309). As a result of the determination of the step S309, when no disable flag is stored in the flag area 113*a*, the CPU 101 stores a disable flag in the flag area 113*a* (step S310) and terminates the present process. On the other hand, when a disable flag is stored in the flag area 113*a*, the present process is terminated with the step S310 skipped.

Figure 6:
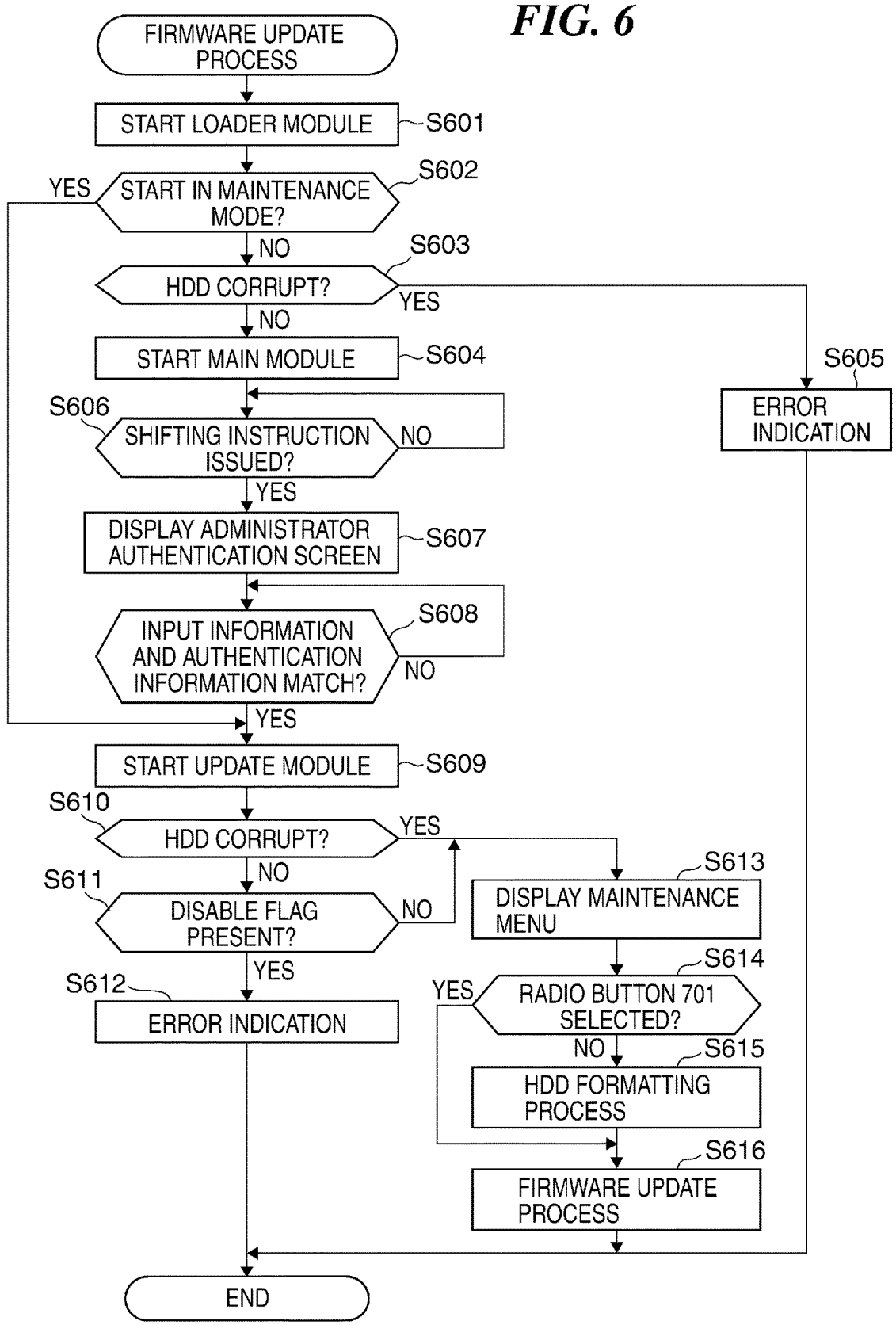
FIG. 6 is a flowchart showing the procedure of a firmware update process which is carried out when an HDD in which a disable flag was stored in the disable flag storage process in FIG. 3 is corrupt when firmware is to be updated.

FIG. 6 is a flowchart showing the procedure of a firmware update process which is carried out when the HDD 113 in which a disable flag was stored in the disable flag storage process in FIG. 3 is corrupt when firmware is to be updated. The update process in FIG. 6 is carried out by the CPU 110.

Referring to FIG. 6, first, the CPU 110 starts the loader module 203 (step S601) and determines whether the image forming apparatus 101 is to started in a maintenance mode, in which firmware applied to the image forming apparatus 101 is updated, or in a normal mode (step S602). It should be noted that the image forming apparatus 101 is started in the maintenance mode, for example, when the administrator user issues, via the operating unit 107, an instruction to update firmware applied to the image forming apparatus 101, or when the administrator user sets in advance a date and time at which firmware applied to the image forming apparatus 101 will be updated and when this date and time has come.

As a result of the determination of the step S602, when the image forming apparatus 101 is to be started in the maintenance mode, the process proceeds to step S609, to be described later, and when the image forming apparatus 101 is to be started in the normal mode, the CPU 110 determines whether or not the HDD 113 is corrupt (step S603). In the step S603, whether or not the HDD 113 is corrupt is determined according to, for example, whether or not readout of a program from the HDD 113 is possible.

As a result of the determination of the step S603, when the HDD 113 is corrupt, the CPU 110 provides, on the operating unit 107, an error indication that the main module 204 cannot be started (step S605) and terminates the present process. On the other hand, when the HDD 113 is not corrupt, the CPU 110 starts the main module 204 (step S604).

The CPU 110 then determines whether or not the administrator user has issued an instruction to shift the image forming apparatus 101 started in the normal mode into the maintenance mode (step S606). As a result of the determination of the step S606, when no instruction to shift into the maintenance mode has been issued, the process returns to the step S606, and when an instruction to shift into the maintenance mode has been issued, the CPU 110 displays the administrator authentication screen 400 on the operating unit 107 (step S607) and determines whether or not input information input to the administrator authentication screen 400 matches authentication information of the administrator user stored in advance in the HDD 113 (step S608). As a result of the determination of the step S608, when the input information and the authentication information do not match, the process returns to the step S608, and when the input information and the authentication information match, the CPU 110 starts the update module 213 (step S609) and determines again whether or not the HDD 113 is corrupt (step S610).

Figure 7:
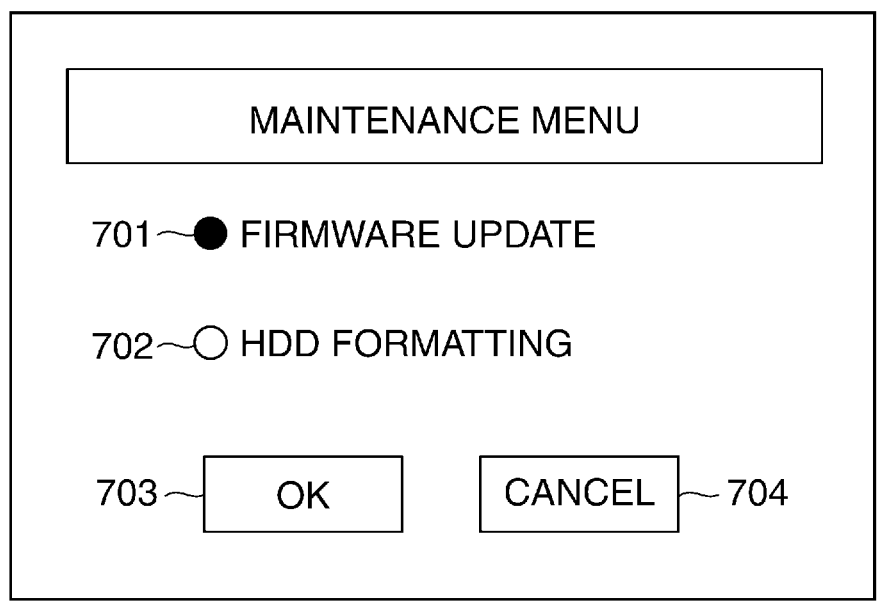
FIG. 7 is a view useful in explaining a maintenance menu which is displayed on the operating unit in the firmware update process in FIG. 6.

As a result of the determination of the step S610, when the HDD 113 is corrupt, the process proceeds to step S613, to be described later, and when the HDD 113 is not corrupt, the process proceeds to step S611. The CPU 110 then carries out a readout process in which it reads a disable flag from the flag area 113*a* of the HDD 113, and based on a result of the readout process determines whether or not a disable flag is stored in the flag area 113*a* (step S611). As a result of the determination of the step S611, when a disable flag has been successfully read from the flag area 113*a* (the readout process is successful), the CPU 110 determines that a disable flag is stored in the flag area 113*a*, the CPU 110 provides, on the operating unit 107, an error indication that an update process for firmware is not to be carried out (step S612), and terminates the present process. On the other hand, when no disable flag has been read out from the flag area 113*a* (the readout process is unsuccessful) or when no disable flag is stored in the flag area 113*a*, the CPU 110 determines that no disable flag is stored in the flag area 113*a* and displays a maintenance menu 700 (FIG. 7) on the operating unit 107 (step S613).

It should be noted that although in the present embodiment, whether or not the HDD 113 is corrupt is determined in the step S610, it may be determined that the HDD 113 is corrupt when readout of a disable flag is unsuccessful in the disable flag readout process in the step S611.

The maintenance menu 700 has radio buttons 701 and 702, an OK button 703, and a cancel button 704. To update firmware, the administrator user selects the radio button 701 and depresses the OK button 703. To format (initialize) an HDD or replace the corrupt HDD 113 with a new HDD, the administrator user selects the radio button 702 and depresses the OK button 703. When the administrator user selects the radio button 701 and depresses the OK button 703, update of firmware is performed, and when the administrator user selects the radio button 702 and depresses the OK button 703, formatting of an HDD is performed.

Referring again to FIG. 6, the CPU 101 determines whether or not the radio button 701 has been selected via the maintenance menu 700 (step S614). As a result of the determination of the step S614, when the radio button 701 has not been selected (that is, when the radio button 702 has been selected), the CPU 101 performs formatting of an HDD (step S615), performs update of firmware (step S616), and terminates the present process. On the other hand, as a result of the determination of the step S614, when the radio button 701 has been selected, the process proceeds to the step S616 with the step S615 skipped. Namely, when the HDD 113 is corrupt, and the maintenance menu 700 is displayed, the CPU 110 performs update of firmware irrespective of whether the radio button 701 or the radio button 702 has been selected, and terminates the present process.

According to the process in FIG. 6, when the HDD 113 having the flag area 113a in which a disable flag is stored is corrupt (YES in the step S610), firmware is updated (step S616), and therefore, firmware is allowed to be updated even when a disable flag stored in the flag area 113a cannot be changed to an enable flag due to the HDD 113 being corrupt, and hence firmware is smoothly updated.

Figure 8:
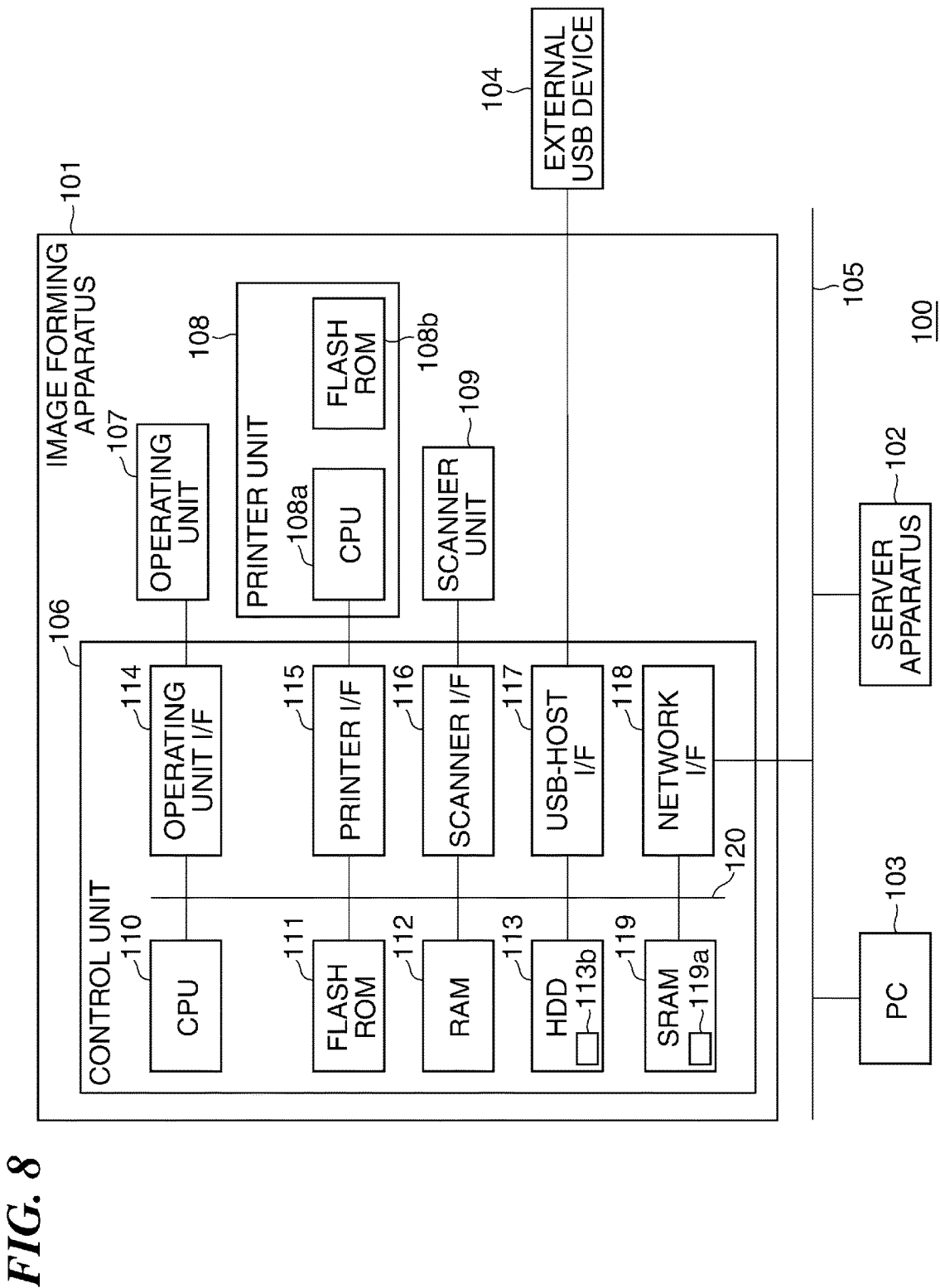
FIG. 8 is a block diagram showing a variation of the information processing system in FIG. 1.

FIG. 8 is a block diagram showing a variation of the information processing system 100 in FIG. 1. Only component elements differing from those of the information system 100 in FIG. 1 will be described below.

The HDD 113 in the information processing system 100 in FIG. 8 has a flag area 113b and does not have the program area 113a. The SRAM 119 has a flag area 119a in which an enable flag or a disable flag is stored. Namely, in the information processing system 100 in FIG. 8, an enable flag or a disable flag is not stored in the HDD 113, and an enable flag or a disable flag is stored in the SRAM 119.

Figure 9:
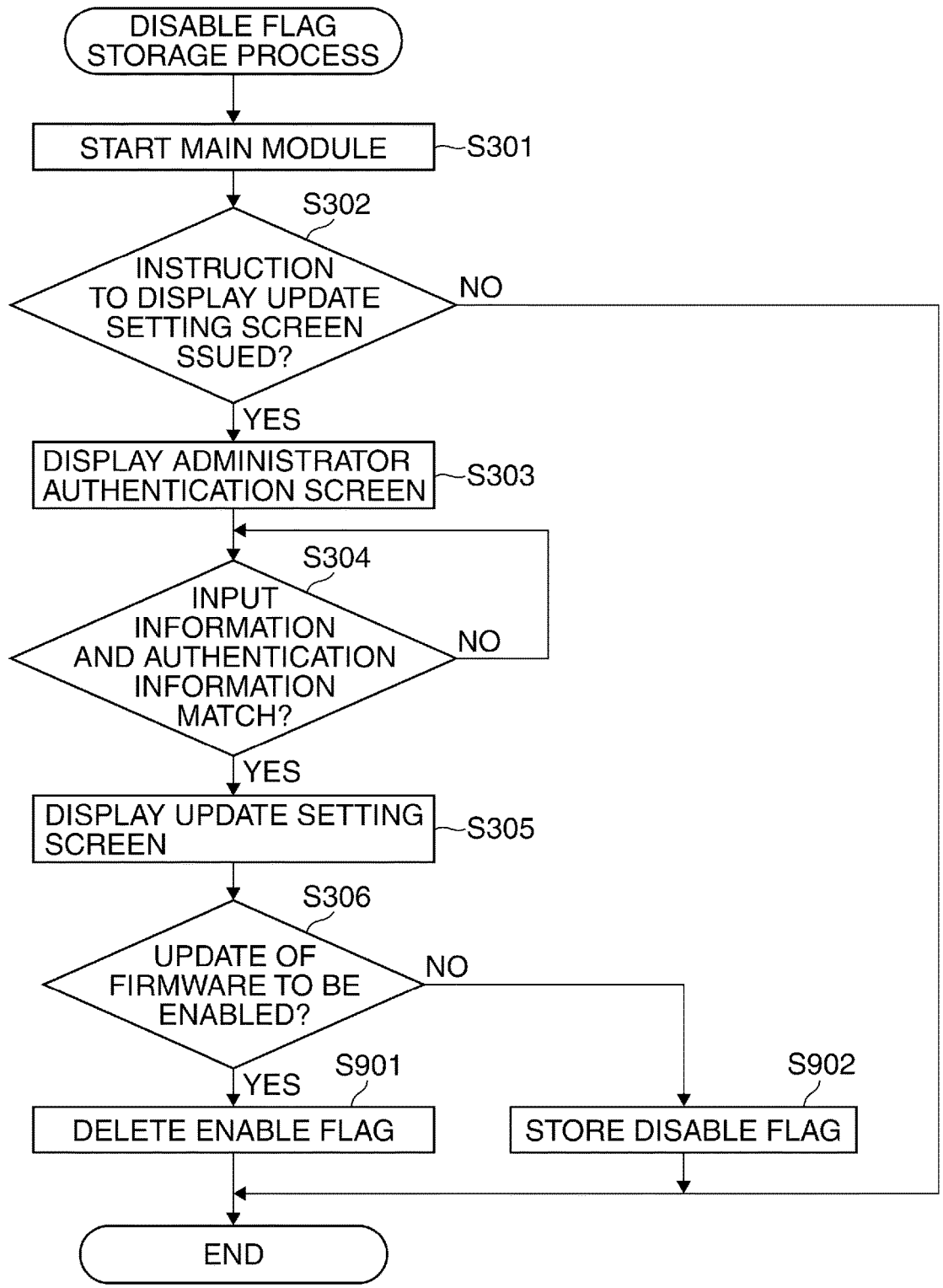
FIG. 9 is a flowchart showing a disable flag storage process which is carried out by a CPU in FIG. 8.

FIG. 9 is a flowchart showing a disable flag storage process which is carried out by the CPU 110 in FIG. 8. The process in FIG. 9 is a variation of the process in FIG. 3, and processes in steps S301 to S306 in FIG. 9 are the same as those in the steps S301 to S306 in FIG. 6, and therefore, only features differing from the processes in FIG. 3 will be described below.

As a result of the determination of the step S306, when the radio button 501 has been selected, the CPU 101 stores an enable flag in the flag area 119a (step S901) and terminates the present process. On the other hand, as a result of the determination of the step S306, when the radio button 501 has not been selected (that is, when the radio button 502 has been selected), the CPU 101 stores a disable flag in the flag area 119a (step S902) and terminates the present process.

Figure 10:
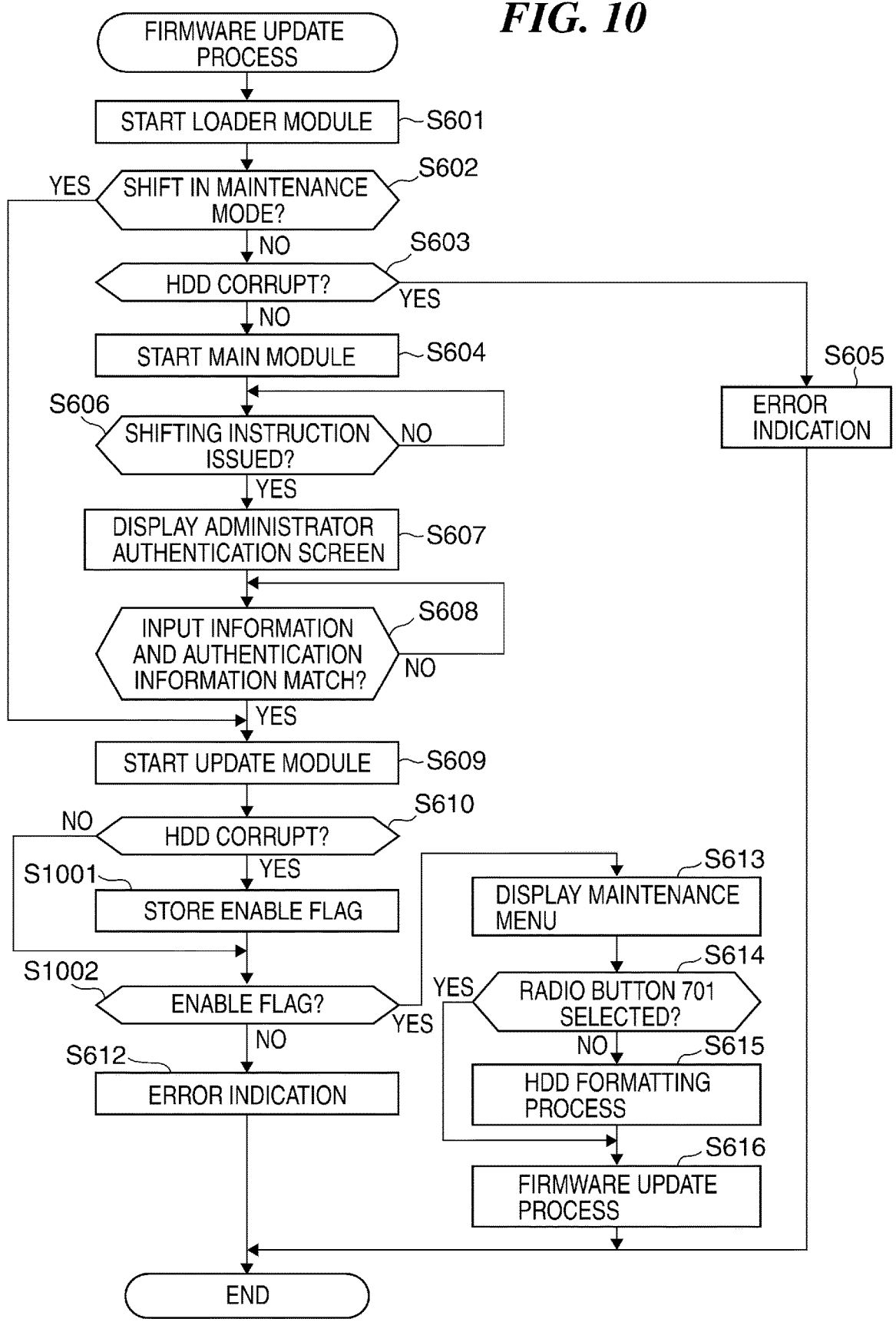
FIG. 10 is a flowchart showing the procedure of a firmware update process which is carried out when an HDD in which a program for change a disable flag to an enable flag, and vice versa in the disable flag storage process in FIG. 9 is corrupt when firmware is to be updated.

FIG. 10 is a flowchart showing the procedure of a firmware update process which is carried out when the HDD 113 in which a program for changing a disable flag to an enable flag, and vice versa in the disable flag storage process in FIG. 9 is corrupt when firmware is to be updated. The process in FIG. 10 is a variation of the process in FIG. 6, and processes in steps S601 to S610 and S612 to S616 in FIG. 10 are the same as those in the steps S601 to S610 and S612 to S616 in FIG. 6, and therefore, only features differing from the processes in FIG. 6 will be described below.

As a result of the determination of the step S610, when the HDD 113 is corrupt, the CPU 110 invalidates a flag stored in the flag area 119a and stores an enable flag in the flag area 119a (step S1001), and determines whether or not the flag stored in the flag area 119a is an enable flag (step S1002). On the other hand, as a result of the determination of the step S610, when the HDD 113 is not corrupt, the process proceeds to the step S1002 with the step S1001 skipped. As a result of the determination of the step S1002, when the flag stored in the flag area 119a is an enable flag, the process proceeds to the step S613, and when the flag stored in the flag area 119a is a disable flag, the process proceeds to the step S612.

According to the process in FIG. 10, when the HDD 113 is corrupt, a flag stored in the flag area 119a is invalidated, and an enable flag is stored in the flag area 119a (step S1001). As a result, even when an HDD is corrupt when a disable flag is stored in the SRAM 119a, a disable flag is changed to an enable flag, and therefore, firmware is allowed to be updated based on the changed flag, and hence the firmware is smoothly updated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-246991, filed Dec. 5, 2014, which is hereby incorporated by reference herein in its entirety.

What is claimed is:

1. An information processing apparatus capable of executing download of firmware, comprising:
 a storage memory including a first storage area that stores instructions and a second storage area that stores a file indicating that download of the firmware is disabled according to a disable setting which disables download of the firmware; and
 a processor connected to the storage memory and configured to execute the instructions stored in the first storage area of the storage memory to:
  perform authentication and, in a case where the authentication is successful, permit setting the disable setting or an enable setting which enables download of the firmware;
  delete the file from the second storage area of the storage memory according to the enable setting;
  execute download of the firmware according to the absence of the file; and
  execute, in a case where readout of the file in the second storage area of the storage memory is not possible by the processor because of corruption of the second storage area of the storage memory, download of the firmware regardless that the file is present.

2. The information processing apparatus according to claim 1, wherein the processor is further configured to decide whether to start the information processing apparatus in a maintenance mode or a normal mode, and wherein when the information processing apparatus is started in the maintenance mode, the file is read from the second storage area of the storage memory.

3. The information processing apparatus according to claim 2, wherein an error indication is provided when the information processing apparatus is started in the normal mode, and it is determined that the second storage area of the storage memory is corrupt or has failed.

4. The information processing unit according to claim 1, wherein the processor is further configured to determine whether the second storage area of the storage memory is corrupt.

5. The information processing apparatus according to claim 1, wherein the storage memory is an HDD.

6. The information processing apparatus according to claim 1, wherein the storage memory is an SRAM.

7. A control method for an information processing apparatus capable of executing download of firmware and having a storage memory including a first storage area that stores instructions to execute the control method and a second storage area that stores a file indicating that download of the firmware is disabled according to a disable setting which disables download of the firmware, the control method comprising:
   an authentication step of performing authentication and, in a case where the authentication is successful, permit setting the disable setting or an enable setting which enables download of the firmware;
   a deleting step of deleting the file from the second storage area of the storage memory according to the enable setting;
   a first execution step of executing download of the firmware according to absence of the file; and
   a second execution step of executing, in a case where readout of the file in the second storage area of the storage memory is not possible because of corruption of the second storage area of the storage memory, download of the firmware regardless that the file is present.

8. A computer-readable non-transitory storage medium storing a program for causing a computer to execute a control method for an information processing apparatus capable of executing download of firmware and having a storage memory including a first storage area that stores instructions to execute the control method and a second storage area that stores a file indicating that download of the firmware is disabled according to a disable setting which disables download of the firmware, the control method comprising:
   an authentication step of performing authentication and, in a case where the authentication is successful, permit setting the disable setting or an enable setting which enables download of the firmware;
   a deleting step of deleting the file from the second storage area of the storage memory according to the enable setting;
   a first execution step of executing download of the firmware according to absence of the file; and
   a second execution step of executing, in a case where readout of the file in the second storage area of the storage memory is not possible because of corruption of the second storage area of the storage memory, download of the firmware regardless that the file is present.

* * * * *